United States Patent [19]

Jelezov et al.

[11] 4,429,821
[45] Feb. 7, 1984

[54] WIRE FEEDING MECHANISM

[75] Inventors: Jivko Y. Jelezov; Todor D. Bogdanov, both of Sofia, Bulgaria

[73] Assignee: DSO "IZOT", Sofia, Bulgaria

[21] Appl. No.: 373,540

[22] Filed: Apr. 30, 1982

[30] Foreign Application Priority Data

Apr. 30, 1981 [BG] Bulgaria .................................. 51 910

[51] Int. Cl.³ ...................... B65H 51/04; B65H 51/32
[52] U.S. Cl. ..................................... 226/181; 226/187; 226/194
[58] Field of Search ............... 226/180, 174, 176, 177, 226/168, 181, 186, 187, 188, 190, 194

[56] References Cited

U.S. PATENT DOCUMENTS

| | | | |
|---|---|---|---|
| 3,014,519 | 12/1961 | Wright | 226/181 X |
| 3,684,152 | 8/1972 | Boden | 226/168 X |
| 3,744,694 | 7/1973 | Karnes | 226/168 |
| 3,746,232 | 7/1973 | Kirillov et al. | 226/188 X |
| 4,049,172 | 9/1977 | Samokovliski et al. | 226/187 X |
| 4,085,880 | 4/1978 | Samokovliski et al. | 226/181 X |
| 4,098,445 | 7/1978 | Samokovliski et al. | 226/186 |
| 4,150,772 | 4/1979 | Auer | 226/188 X |
| 4,172,545 | 10/1979 | Jones | 226/168 |

Primary Examiner—Stanley N. Gilreath

[57] ABSTRACT

Planetary wire-feeding device having a housing containing rollers which freely rotate about axles arranged at an angle to each other and crossing the electrode wire being fed by the mechanism. In one embodiment disclosed herein the housing is of spherical form and is made of two identical hemispherical parts interconnected by means of connecting means which are placed in tension. Two opposite coaxial holes the geometrical axis of which lies at the contact plane between the two hemispherical parts of the housing are formed in the hemispheres. The unit for thrusting the opposed rollers toward each other and into engagement with the wire is formed as a support seat formed in each hemispherical part of the housing, the seats being parallel to the contact plane between such hemispherical parts. The limiting cylindrical part of the support and guiding component is mounted at the opposite ends of the support and guiding component in the two coaxial holes in the housing and the central hub thereof rests in the cylindrical seat provided in each hemispherical part above the supporting seat.

4 Claims, 9 Drawing Figures

WIRE FEEDING MECHANISM

This invention relates to wire feeding mechanism, such mechanism being particularly useful in the feeding of electrode wire for welding in a protective medium.

A planetary wire feeding mechanism, disclosed in Bulgarian Authorship Certificate No. 25 847, has a housing containing rollers which freely rotate upon axles arranged at an angle and crosswise with respect to the electrode wire fed by the rollers. The housing and the rollers rotate about the electrode wire, and by so doing feed the wire forwardly. The roller axles are fitted to pistons in contact with short arms of arcuate two-armed levers, and a coil spring constantly urges the other, longer arms of the levers into engagement with a cam which thrusts the rollers into forcible engagement with the electrode wire.

A shortcoming of this prior art device is the lack of quick and smooth adjustment of the rollers when operating with electrode wires of different toughness or hardness since readjustment is effected by affixing one end of the coil spring to different anchoring holes in the frame of the device, or by the replacement of the spring by a spring having different force characteristics.

Another shortcoming of such prior art mechanism is the difficult separation of the wire-feeding rollers to accomodate electrode wires with different allowable deviations from geometrical perameters thereof such as differences in diameter, irregular geometrical shapes of the sections of the wire, differences in surface roughness of the wire, and so forth.

There are also wire-supplying devices wherein the pressure which the rollers exert against the wire is effected by means of devices including roller axle carriers with guiding surfaces inclined toward the axis of electrode wire and driven by driving units of screw mechanisms with wire driving guides. Devices of this type are disclosed in GDR-Patent No. 140,116, and also in U.S. Pat. No. 4,172,545.

The most important shortcoming of the latter disclosed prior art mechanisms is their inability to establish a satisfactory elastic coupling directly between the wire feeding rollers and the compression devices which urge the rollers against the wire.

Other common defects of well-known prior wire-feeding devices are as follows:

available eccentricity between the giuiding and supporting components wherein the roller axles are fitted and the components for thrusting the rollers against the wire, on one side, and the rollers themselves, on the other, as a result of which unbalance centrifugal forces appear when the device rotates, especially when there is a unilateral laying of or control of the mass of the guiding and supporting components associated with each roller with respect to the axis of the electrode wire;

inability of the rollers to follow all irregularities and changes along the wire and its cross section, as well as no automatic adjustment of the compressive roller force in accordance with changes in the resistance of feeding of the wire through the holes during the welding operation, such changes preventing a smooth wire feeding by such devices.

It is among the objects of the present invention to provide a wire feeding mechanism of a simple, lightweight and improved technological design, such mechanism having comparitively few parts and components, with a fast reaction time, but smooth roller adjustment differentiated in accordance with the properties and size of the electrode wire being fed by it.

A preferred embodiment of wire feeding mechanism in accordance with the invention includes a housing containing rollers freely rotating around their axes. The axles which mount the rollers are fitted at an angle, and are crossed with respect to the electrode wire being fed thereby, so that the rollers, which rotate around the wire, travel in helical lines about the electrode wire. The axles bearing the rollers are fitted to a support and guiding component and power transmission units by devices which thrust the rollers against the electrode wire. In the preferred embodiment shown, the housing is spherical and the support and guiding roller unit is designed as one body consisting of oppositely directed cylindrical end parts and a central hub. Part-cylindrical roller axle nests or seats are machined in the hub. Each roller pressing device includes at least one disc spring fitted on flat supporting steps or seats provided in the housing at both ends of each axle, the housing is made in two parts which are forcibly thrust together so as to compress the opposite disc springs and to urge the respective rollers toward the axis of the electrode wire. The roller axle steps in the housing have surfaces corresponding to the surface of the respective disc spring resting upon it.

As above mentioned, the spherical housing is preferably made with two identical hemispherical parts which are interconnected by means of fastening devices strongly urging the two hemispheres together. Two opposite coaxial holes, the geometrical axis of which lies in the plane of contact of the two hemmispheres, are provided in the hemispheres. The unit which thrusts the axles of the rollers toward their part-cylindrical seats (when electrode wire is not fed through the mechanism) disposed in the hub of the support and guiding unit is formed as a flat support seat provided in each hemisphere, the flat support seat being parallel to the above-mentioned contact plane between the hemispheres. The oppositely directed cylindrical end parts of the support and guiding component are mounted in the respective coaxial holes, and the hub rests in a central space provided in each hemisphere radially outwardly of the flat supporting nest. The operating surface of the supporting seat is perpendicular to the geometrical axis of the cylindrical operating surface of the cylindrical nest.

In a further embodiment of the invention, the support and guiding unit is a part integral with the body of the spherical housing, there being provided two oppositely directed threaded holes in the housing parts which are coaxial of the electrode wire fed by the mechanism. Each force transmitting unit includes a nut, the front part of which is machined to form a resting nest. A nut is screwed to the spherical housing on each end thereof, so that both nuts are coaxial to each other and perpendicular to the length of the electrode wire being fed by the mechanism.

The advantages of the invention are that the wire feeding mechanism is simple in design, technologically desireable, light in weight, and is fairly easily made so that it is not unduly labor consuming to make. In addition, the mechanism has a fast reacting but smooth adjustment of the rollers, such adjustment being differentiated in accordance with the properties and sizes of the electrode wires fed by the mechanism.

Two embodiments of the wire feeding mechanism in accordance with the invention are shown in the accompanying drawings, wherein.

Figure 5:
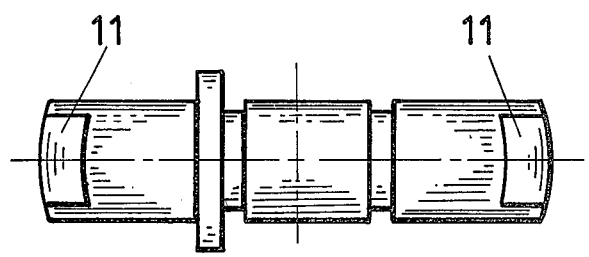
FIG. 5 is a view in side elevation of a roller axle.
Figure 6:
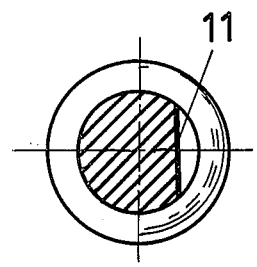
FIG. 6 is a view in end elevation of the axle roller shown in FIG. 5, the view being taken looking to the right from the lefthand end of the axle shown in FIG. 5 as indicated by the line 6—6 in FIG. 5.
Figure 7:
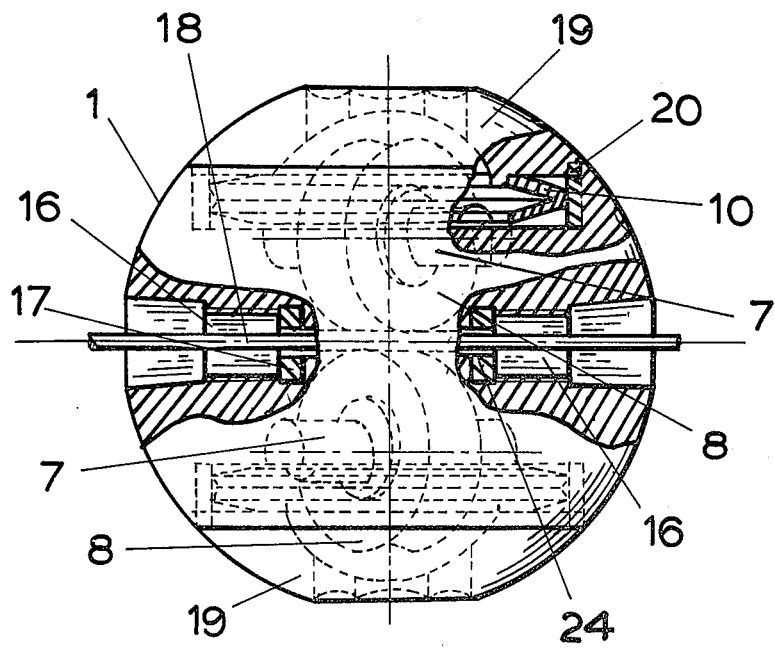
FIG. 7 is a view of a second embodiment of the mechanism according to the invention, such figure comprising partial sections.
Figure 8:
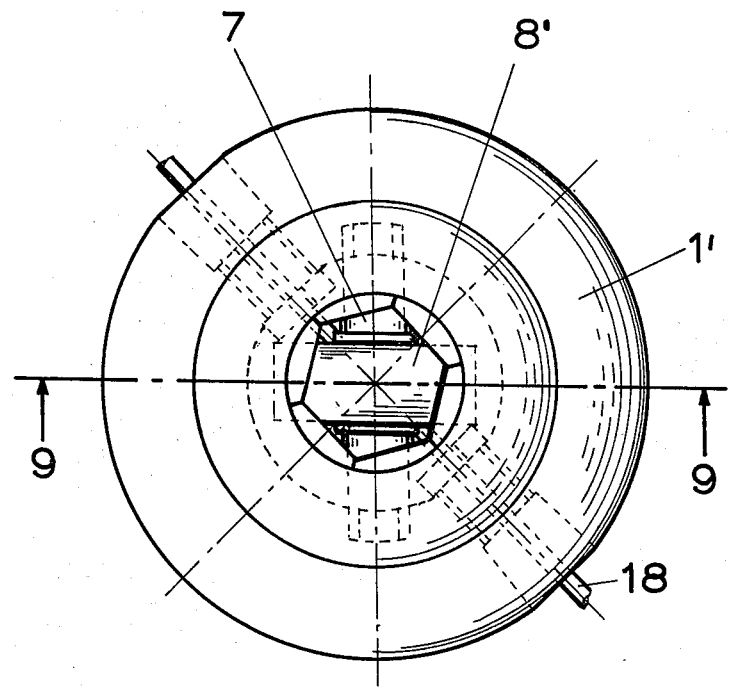
FIG. 8 is a view in horizontal axle section through the mechanism of FIG. 7 with an upper cap removed, the parts being shown in elevation.
Figure 9:
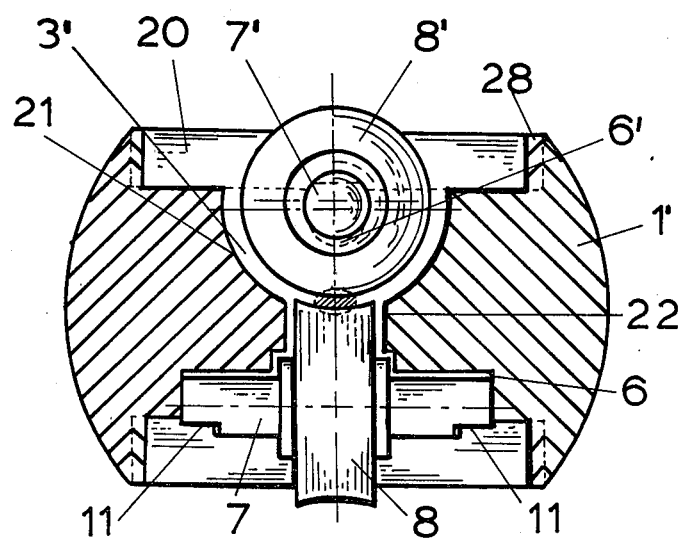
FIG. 9 is a view in cross-section through the second embodiment of mechanism in accordance with the invention, the section being taken along the line 9—9 in FIG. 8 the caps and the two springs being removed, the axles and the rollers are shown in elevation.

As is apparent from the above, two embodiments of the mechanism of the invention are disclosed herein. The first such embodiment is shown in FIGS. 1-6 of the drawings; the second embodiment is shown in FIGS. 7, 8 and 9. Similar parts throughout the several figures of the drawings are designated by the same reference characters.

Figure 1:
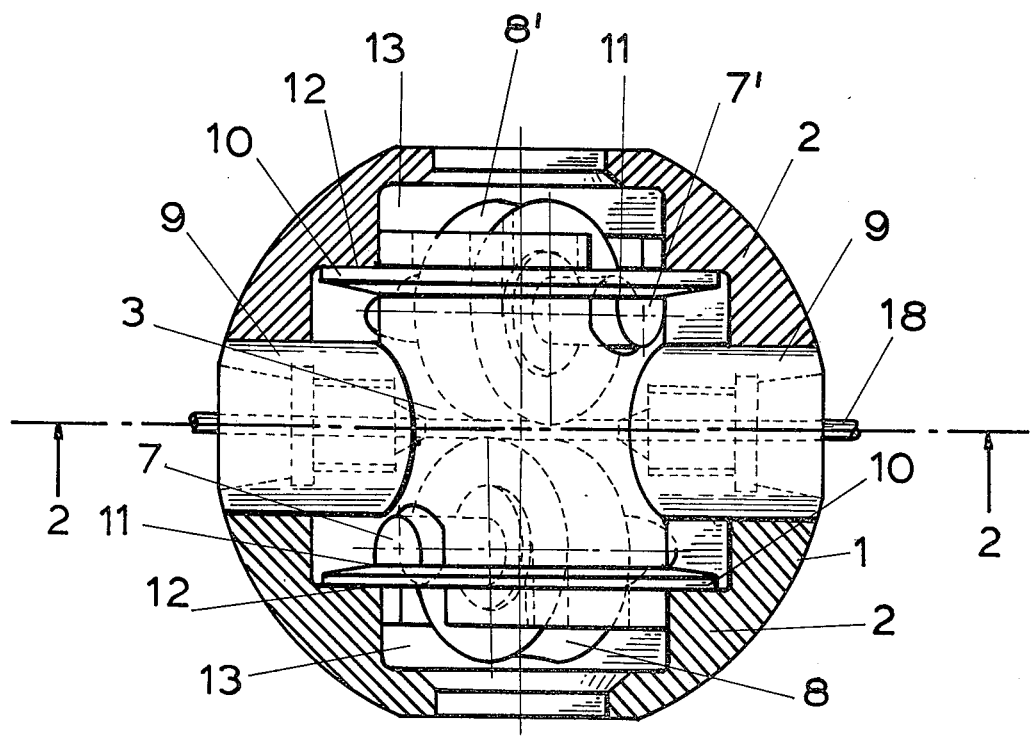
FIG. 1 is a view in vertical axle section through the first disclosed embodiment of the mechanism of the invention, certain of the parts being shown in elevation.
Figure 2:
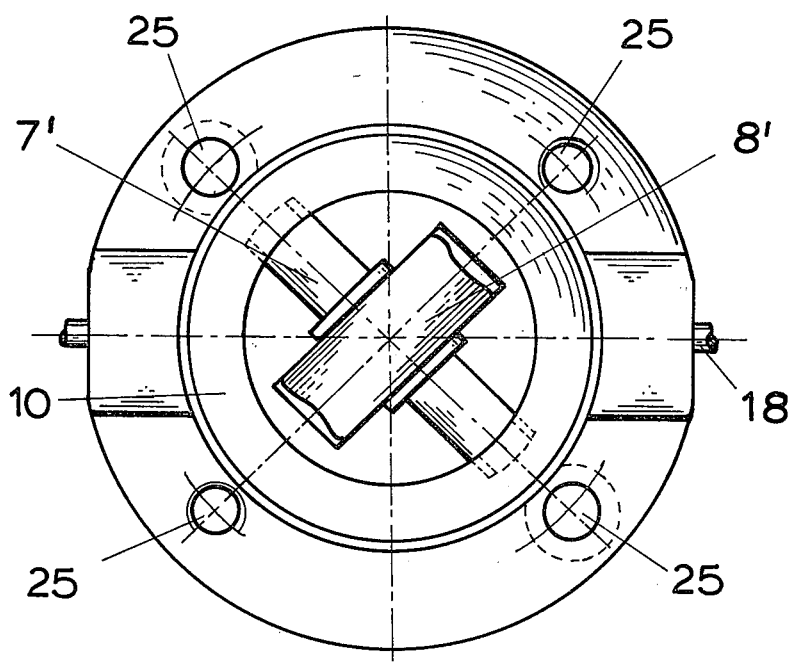
FIG. 2 is a view in horizontal axial section through the mechanism of FIG. 1, with an upper hemisphere of the spherical housing removed, the parts being shown in elevation.

Turning first to FIGS. 1-6, incl., as shown in FIGS. 1 and 2 the mechanism there shown has a spherical housing 1 made up of two identical hemispherical parts 2 which are interconnected and drawn together by machine bolts or studs 25, which are shown in FIG. 2. Within a space provided within the two hemispherical parts 2 of the housing 1 there is mounted a support-and-guiding component 3 made as an integral unit. Such part is more clearly shown in FIGS. 3 and 4.

Figure 3:
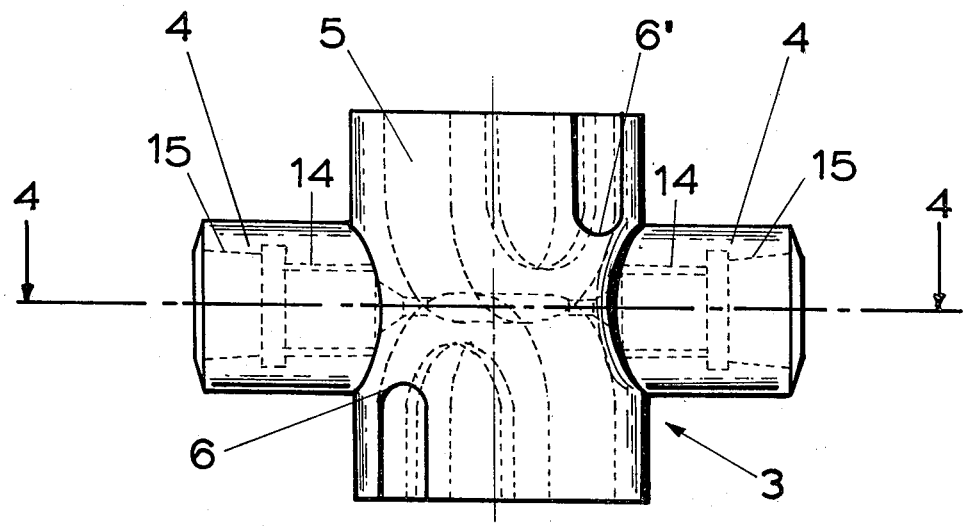
FIG. 3 is a view in side elevation of the support and guiding unit employed in the mechanism of FIGS. 1 and 2.
Figure 4:
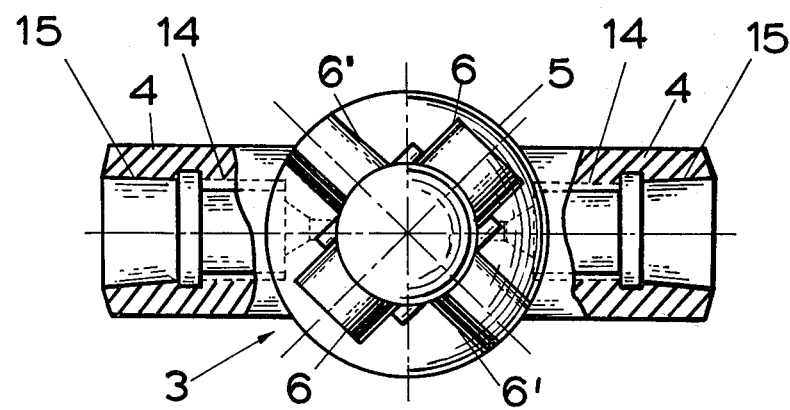
FIG. 4 is a view in elevation looking in the direction from top to bottom of the support and guiding unit of FIG. 3, the figure comprising partial sections.

As shown in FIGS. 3 and 4, the part 3 has a central hub 5 and two oppositely directed circular cylindrical parts 4. Part-cylindrical seats 6,6' are provided in hub 5, such seats receiving axles 7,7' for the opposing rollers 8, 8'; such rollers can rotate freely about their respective axles 7,7'. The axles 7,7' are mounted at an angle (shown as 45 degrees in the drawings), the axes of the opposing rolls being disposed at 90 degrees with respect to each other. It is thus apparent that the axes of the rollers 8, 8' are disposed in planes which extend at an angle of 45 degrees with respect to the longitudinal axis of the wire 18 being fed by the mechanism, and that the housing 1 as a whole, carrying with it the unit 3 and the rollers mounted therein rotate about the axis of the wire 18, the rollers traveling in helical paths about the axis of the wire.

In both hemispherical parts 2 there are disposed half-cylindrical grooves or passages, such half-cylindrical grooves forming holes 9 when the hemispherical parts are disposed in assembled condition; the geometrical axis of the holes 9 is disposed in the plane of contact between the two hemispherical housing parts 2. Each of the axles 7,7' is strongly thrust toward the respective cylinderical nests 6,6', provided in hub 5 when the hemispherical parts 2 are pulled together by the bolts in holes 25 by means of disc or Belleville springs 10, springs 10 being disposed in alignment, as shown in FIG. 1, each such spring resting upon a step or seat 12 provided in the respective hemispherical housing part 2. As shown in FIGS. 5 and 6, the opposite ends of each axle 7,7' are provided with a flat portion 11, the two portions 11 being disposed in alignment and resting upon diametrically opposed parts of the inner edge portion of the respective disc spring 10. Each disc spring 10 is in the form of a frustum of a cone. Rollers 8,8' are not in direct contact. During the operation of the mechanism, their respective hyperbolic surfaces are pressed against the electrode wire by forces equal to the spring forces. The roller axles are removed from their bearing grooves by the electrode wire fed between the roller.

Upon the screwing home of the studs or machine bolts 25, thereby to draw the two hemispherical parts 2 together, the seats 12, which support the disc springs 10, thrust the springs against the ends of the axles 7,7' and thus strongly thrust the axles 7,7' toward the cylindrical nests 6,6'. This action compresses the disc springs 10 which, of course, become increasingly compressed upon the entry of a wire 18 between the rollers, and the consequent separation of the rollers from each other.

Each of the cylindrical end parts 4 of the support-and-guiding component unit 3 is fitted into the respective one of the coaxial holes 9 in the housing 1, and the hub 5 of unit 3 is disposed within the cylindrical seat 13 within the housing 1, seat 13 being formed half in one hemispherical part 2 and half in the other. The operating surface of the supporting nest or seat 12 is disposed perpendicular to the geometrical axis of the operating surface of the cylindrical seats 13 in the housing 1.

Seats 6,6' machined in both ends of hub 5 are shaped as diametrically disposed longitudinal slots. The axes of seats 6 cross at an angle from 40 degrees to 120 degrees with respect to each other, and at an angle which is one-half such value with respect to the axis of the cylindrical end parts 4 of unit 3. Each part 4 of the unit 3 has a central hole therewithin, the two such holes being coaxial and having threads 14 therein. The outer end surfaces of the cylindrical parts 4 of unit 3 are partspherical in shape, and have a radius equal to the radius of the spherical housing 1, as shown in FIG. 1. Furthermore, in each of the cylindrical parts 4 of unit 3, in front of threads 14, the hole therein is tapered, as shown at 15, for easier connection to the driving electric motor (not shown) which drivingly rotates it about the axis of the wire 18.

The wire-feeding mechanism shown in FIGS. 1-6, incl., operates in the following manner:

The wire-feeding mechanism driving motor (not shown) is turned on so as to feed the electrode wire 18 forwardly to a welding station (not shown). The front end of the electrode wire 18 is passed through the central bore in the shaft of the driving electric motor (not shown) and the electrode wire 18 starts feeding through the limiting cylindrical part 4 of the unit 3. In this state, rollers 8, 8' are pressed by their hyperboloid surfaces against the electrode wire 18 by a force equal to the spring forces actuated by the deformation of the disc springs 10. The normal forces by which rollers 8, 8' are thrust against the electrode wire 18 give rise to tangential forces having a point of application on the electrode wire 18 and direction coinciding with the direction of the electrode wire as it is fed forward during a welding operation. The magnitude of the thus created tangential forces upon the electrode wire 18 is sufficient to drive such wire with the speed required for the welding operation. If it is desired to remove the electrode wire 18 from its shielding hose (not shown), this can be readily done by reversing the electric motor which drives the wire-feeding mechanism.

The second disclosed embodiment of the mechanism according to the invention is shown in FIGS. 7, 8 and 9. Such mechanism has a spherical housing 1' formed integrally of plastic material, housing 1' containing a support-and-guiding component 3' which functions in a manner similar to the component 3 in the first-described embodiment of FIGS. 1-6, inclusive. In this latter case, the role of the hub 5 of the embodiment of FIGS. 1-6, incl., is played by cylindrical seats 21 and 22 which are machined in the housing 1' for guiding axles 7,7' on which rollers 8, 8', which have a hyperbolic profile, rest. The geometrical axes of cylindrical seats 21 and 22 cross at a specified angle. In the spherical housing 1' two opposite threaded holes 16 are machined, such holes being coaxial with the axis of the electrode wire 18 being fed. Input nozzle 17 and output nozzle 24 are disposed in the housing inwardly of the threaded holes 16, the electrode wire 18 passing through said nozzles. The axles, 7,7' mounting the rollers 8,8' are thrust toward each other by means of paired opposite disposed Belleville springs 10, which are shown in FIG. 7. Devices 19 pass oppositely disposed packets of disc or Belleville springs 10' toward each other, such spring packets 10' resting on steps 11 at the ends of the axles 7,7'. Each disc spring packet 10' is connected to its corresponding thrusting means 19, such thrusting means being shaped as a cap, the front part of which is provided with an annular pilot portion 26 which fits within the hole in the upper disc spring as shown in FIG. 7. The spring packets 10' are disposed within respective seats 20 at the upper and lower (FIG. 7) ends of the housing 1'. Each cap 19 has an externally threaded portion 27 which is screwed into the internally threaded side wall of the seat 20. This permits the disc spring packets 10' to be placed in compression, whereby to urge the opposing rollers 8, 8' toward engagement with each other.

The wire-feeding mechanism of FIGS. 7, 8 and 9 operates in the following manner:

The motor for driving the wire-feeding mechanism is turned on so that it drives the mechanism in the direction to feed the electrode wire forwardly to the welding station. The front part of the electrode wire 18 is fed through the central bore in the motor shaft of the electric motor which drives the mechanism (not shown) and through the input nozzle 17 of the wire-feeding mechanism. The rollers 8, 8' are thrust toward each other so that their hyperboloid surfaces engage the electrode wire 18 with forces equal to that exerted upon them by the deformation of the disc spring packets 10'. The driving motor rotates the wire-feeding mechanism about the electrode wire 18. The normal forces by which rollers 8, 8' are thrust against the electrode wire 18 give rise to tangential forces having a point of application on the electrode wire 18 and direction coinciding with the direction of feeding of the electrode wire 18 during a welding operation. The magnitude of the thus generated tangential forces is sufficient to drive the electrode wire with the speed required for the welding operation.

Although the invention is illustrated and described with reference to a plurality of embodiments thereof, it is to be expressly understood that it is in no way limited to the disclosure of such preferred embodiments, but is capable of numerous modifications within the scope of the appended claims.

We claim:

1. In wire-feeding mechanism including a housing containing rollers freely running around axles disposed at an angle with respect to each other and crossing the wire being fed by the mechanism, the housing and the rollers rotating about the wire and the rollers traveling in helical directions about the wire, the axles being mounted in a support and guiding unit, and thrust transmitting units mounted upon the housing for thrusting the rollers in the support and guiding unit toward each other and into forcible engagement with the wire, the improvement wherein the housing is spherical and presents the cavity therewithin in which the support and guiding unit is disposed, and the support and guiding unit for the rollers is shaped as one body having oppositely directed cylindrical end portions projecting from a central hub, and seats provided in the central hub for the axles of the rollers, each thrust transmitting unit for thrusting the rollers together including at least one disc spring disposed between flat portions provided at each end of each axle and a respective flat supporting seat on the housing.

2. Wire-feeding mechanism according to claim 1, wherein the flat portions on the ends of the axles for the rollers are in the form of surfaces corresponding to the surfaces of the portion of the disc spring which rests upon it.

3. Wire-feeding mechanism according to claim 1, wherein the spherical housing is made of two hemispherical parts interconnected by means of connecting means placed in tension, there are two opposite coaxial holes provided half in one hemispherical part and half in the other hemispherical part of the housing, the geometrical axis of said coaxial holes is disposed in the contact plane between the two hemispherical portions of the housing, and each thrust transmitting unit is formed as a flat supporting seat included in each hemispherical part of the housing, such supporting seat being parallel to the contact plane between the two hemispherical parts of the housing, the supporting and guiding unit having cylindrical end parts, such end parts being fitted in two coaxial holes in the housing, the central hub in the support and guiding unit fitting within a space in each hemispherical part of the housing radially outwardly of the part-cylindrical seat receiving the axles for the rollers, and the surface of the flat supporting seat is perpendicular to the geometrical axis of the cylindrical surface of the part-cylindrical seat which receives the ends of the axles.

4. Wire-feeding mechanism according to claim 1, wherein the support and guiding unit is made integral with the spherical housing itself, in the spherical housing there being provided two opposite threaded holes coaxial with the axis of the electrode wire being fed by the mechanism, and each thrust transmitting unit is made in the shape of a cap the inner part of which is machined as a supporting seat, and each cap is screwed in the spherical housing so that both caps are coaxial to each other and perpendicular to the electrode wire being fed by the mechanism.

* * * * *